United States Patent
Dagner et al.

(10) Patent No.: US 9,547,290 B2
(45) Date of Patent: Jan. 17, 2017

(54) CONTROL METHOD FOR A ROLLING TRAIN

(75) Inventors: Johanned Dagner, Erlangen (DE); Ansgar Grüss, Erlangen (DE)

(73) Assignee: PRIMETALS TECHNOLOGIES GERMANY GmbH, Erlangen (DE)

( * ) Notice: Subject to any disclaimer, the term of this patent is extended or adjusted under 35 U.S.C. 154(b) by 394 days.

(21) Appl. No.: 14/119,972

(22) PCT Filed: May 4, 2012

(86) PCT No.: PCT/EP2012/058197
§ 371 (c)(1),
(2), (4) Date: Nov. 25, 2013

(87) PCT Pub. No.: WO2012/159866
PCT Pub. Date: Nov. 29, 2012

(65) Prior Publication Data
US 2014/0129023 A1 May 8, 2014

(30) Foreign Application Priority Data
May 24, 2011 (EP) .................................... 11167286

(51) Int. Cl.
*G05B 15/02* (2006.01)
*B21B 37/58* (2006.01)
(52) U.S. Cl.
CPC ............... *G05B 15/02* (2013.01); *B21B 37/58* (2013.01); *B21B 2261/21* (2013.01)
(58) Field of Classification Search
CPC .................................. B23P 17/00; G05B 15/02
See application file for complete search history.

(56) References Cited

U.S. PATENT DOCUMENTS

| 3,940,598 A | * | 2/1976 | Sekiguchi | ............... B21B 37/58 700/153 |
| 4,063,076 A | * | 12/1977 | Morooka | .................. B21B 1/04 700/153 |

(Continued)

FOREIGN PATENT DOCUMENTS

| CN | 1243047 | 2/2000 |
| CN | 1589184 | 3/2005 |

(Continued)

OTHER PUBLICATIONS

Russian Office Action dated Nov. 24, 2015 in corresponding Russian Patent Application No. 2013157109/02(089049) with German Translation.

(Continued)

*Primary Examiner* — Kenneth M Lo
*Assistant Examiner* — David Wynne
(74) *Attorney, Agent, or Firm* — Staas & Halsey LLP

(57) ABSTRACT

Based on an actual temperature upstream of a roll stand, a predicted temperature is estimated for when strip sections of the strip will roll through the roll stand. The predicted temperature is used to predict material moduli, which is used to control a regulating device that influences a roll gap for the roll stand and to parameterize a roll gap control system. A roll gap profile is predicted based on the predicted temperatures, and is compared with a nominal roll gap profile. A regulating variable that influences a profile of a roll gap is set. The regulating variable is then corrected based on the comparison with the nominal roll gap profile. The predictions are made using a prediction horizon corresponding to a plurality of consecutive sections of the strip. Control is performed for both an operator side and a drive side of the strip.

12 Claims, 12 Drawing Sheets

(56) References Cited

U.S. PATENT DOCUMENTS

| | | | | |
|---|---|---|---|---|
| 4,274,273 A | * | 6/1981 | Fapiano | B21B 37/74 700/153 |
| 4,648,256 A | * | 3/1987 | Wakamiya | B21B 37/38 72/241.8 |
| 4,691,547 A | * | 9/1987 | Teoh | B21B 37/66 72/10.7 |
| 4,912,954 A | * | 4/1990 | Vegter | B21B 37/16 700/149 |
| 5,396,416 A | * | 3/1995 | Berkowitz | F25J 3/0209 700/30 |
| 5,520,037 A | * | 5/1996 | Sorgel | B21B 37/16 72/10.3 |
| 5,651,281 A | | 7/1997 | Seidel | |
| 5,871,138 A | * | 2/1999 | Shishido | B23K 13/015 228/102 |
| 5,970,765 A | | 10/1999 | Seidel | |
| 6,014,881 A | * | 1/2000 | Imanari | B21B 37/32 72/201 |
| 6,860,950 B2 | * | 3/2005 | Franz | B21B 37/76 148/503 |
| 7,031,797 B2 | * | 4/2006 | Reinschke | B21B 37/28 700/148 |
| 7,181,822 B2 | | 2/2007 | Ondrovic et al. | |
| 7,197,802 B2 | | 4/2007 | Kurz et al. | |
| 7,865,341 B2 | * | 1/2011 | Borchers | G05B 17/02 703/2 |
| 8,185,217 B2 | * | 5/2012 | Thiele | G05B 13/042 700/29 |
| 2003/0065410 A1 | * | 4/2003 | Martin | G05B 13/042 700/37 |
| 2004/0025558 A1 | * | 2/2004 | Ziegelaar | B21B 37/28 72/205 |
| 2004/0205951 A1 | * | 10/2004 | Kurz | B21B 37/74 29/407.05 |
| 2006/0156773 A1 | * | 7/2006 | Kurz | B21B 37/74 72/8.5 |
| 2009/0117647 A1 | * | 5/2009 | Buddhi Srinivasa | C12M 41/32 435/289.1 |
| 2009/0139290 A1 | * | 6/2009 | Britanik | B21B 37/28 72/9.2 |
| 2009/0282884 A1 | * | 11/2009 | Pawelski | B21B 37/44 72/201 |
| 2009/0326700 A1 | * | 12/2009 | Kurz | B21B 37/00 700/108 |
| 2010/0132426 A1 | | 6/2010 | Baumgärtel et al. | |
| 2011/0106512 A1 | * | 5/2011 | Hainke | G05B 17/02 703/2 |
| 2013/0054003 A1 | * | 2/2013 | Weinzierl | B21B 37/74 700/153 |
| 2014/0129023 A1 | * | 5/2014 | Dagner | B21B 37/58 700/148 |

FOREIGN PATENT DOCUMENTS

| | | | | |
|---|---|---|---|---|
| CN | 1267216 | | 8/2006 | |
| CN | 1887462 | | 1/2007 | |
| DE | 3515429 | | 11/1985 | |
| DE | 40 40 360 | A1 | 6/1991 | |
| DE | 10156008 | | 6/2003 | |
| DE | EP 2301685 | A1 * | 3/2011 | B21B 37/74 |
| EP | 0 618 020 | A1 | 10/1994 | |
| EP | 0 850 704 | A1 | 7/1998 | |
| EP | 2301685 | | 3/2011 | |
| EP | 11167286.1 | | 5/2011 | |
| EP | PCT/EP2012/058197 | | 5/2012 | |
| JP | 61-289908 | | 12/1986 | |
| JP | 4-313412 | | 11/1992 | |
| RU | 2189875 | C2 | 9/2002 | |
| WO | 2008/043684 | | 4/2008 | |
| WO | WO 2008/145222 | A1 | 12/2008 | |
| WO | 2012/159866 | | 11/2012 | |

OTHER PUBLICATIONS

English language International Search Report for PCT/EP2012/058197, mailed Jul. 16, 2012, 2 pages.

European Office Action for European Priority Patent Application No. 11167286.1, issued Oct. 19, 2011, 5 pages.

Chinese Office Action for related Chinese Patent Application No. 2012800247380, issued Oct. 8, 2014, 11 pages.

Chinese Office Action for related Chinese Patent Application No. 201280024738.0, issued Jun. 10, 2015, 12 pages.

Russian Office Action for related Russian Patent Application No. 2013157109/02(089049), non-extended reply due Aug. 28, 2015, 15 pages (including German translation).

Office Action mailed May 18, 2016 in European Patent Application No. 12718243.4.

* cited by examiner

CONTROL METHOD FOR A ROLLING TRAIN

CROSS REFERENCE TO RELATED APPLICATIONS

This application is based on and hereby claims priority to International Application No. PCT/EP2012/058197 filed on May 4, 2012 and European Application No. 11167286.1 filed on May 24, 2011, the contents of which are hereby incorporated by reference.

BACKGROUND

The present invention relates to a control method for a rolling mill train, wherein an adjusting device acting on a first roll stand of the rolling mill train is controlled during rolling of strip sections taking at least one control parameter into account.

The present invention also relates to a computer readable storage medium, a control computer and a rolling mill train.

Temperature fluctuations over the width and length of the strip can result in considerable malfunctions during rolling. The changing material hardness causes variations in the rolling force which can in turn lead to other roll stand reactions which, for their part, result in a change in the roll gap profile. Examples of such roll stand reactions are roll flattening, roll deflection and stand spring. Added to these are a change in the roll crowning due to contact of the work rolls with the differentially heated strip. This also affects the roll gap geometry. If such changes in the roll gap profile are not taken into account, this will result in gauge, profile and flatness defects.

The known setpoint value calculation for rolling mill trains (pass schedule calculation) can only make limited provision for temperature variations in the longitudinal direction (head, strip and tail temperature) and none at all in the strip width direction. Until now, such effects have sometimes been compensated using automatic gauge control (AGC) which at least partly corrects the setting deviations due to roll stand reaction. In addition, techniques are known in which a rolling force measurement in the first roll stand of a multi-stand rolling mill train is used for feed-forward control of the remaining stands.

Both procedures have their disadvantages. For example, automatic gauge control (AGC) cannot react to variations in the temperature profile across the width of the strip. Above all, any asymmetry in material strength (e.g. caused by a temperature wedge) and, associated therewith, any roll stand reaction asymmetry is not taken into account. Feed-forward control of the stands of a multi-stand rolling mill train by rolling force measurement in the first roll stand of the rolling mill train cannot, by its very principle, be used for a single-stand train.

This problem is particularly prevalent in continuous casting and rolling plants where there is little or no way to compensate for temperature variations in the strip, so that temperature profiles (over the length and/or the strip width) have not evened out before the strip reaches the roll stand or stands. Temperature variations can also occur in hot-rolled wide strip trains, e.g. due to the so-called skidmarks or uneven through-heating of the cast slab in the furnace.

DE 101 56 008 A1 and, with identical content, US 2004/205 951 A1 disclose a control method for a rolling mill train,
    wherein a strip section temperature is determined in each case for strip sections upstream of the first roll stand,
    wherein the strip section temperatures for the time of rolling of the respective strip section in the first roll stand are included in the calculation in real time by a strip model.

In DE 101 56 008 A1, the temperature behavior and possibly also the phase transformation of the strip sections are determined purely with the aim of suitably adjusting strip heating and/or strip cooling. DE 101 56 008 A1 makes no provision for using the determined temperature in connection with the rolling process as such.

WO 2008/043 684 A1 discloses a control method for a rolling mill train,
    wherein a strip section temperature is determined in each case for strip sections upstream of a first roll stand of the rolling train,
    wherein the strip section temperatures for the time of rolling of the respective strip section in the first roll stand are predicted by a strip model on the basis of the temperatures determined,
    wherein, using the predicted temperatures of the strip sections, at least one respective control parameter for rolling of the strip sections in the first roll stand is determined,
    wherein an adjusting device acting on the first roll stand is controlled during rolling of the respective strip section taking the respective control parameter determined into account.

The Patent Abstracts of Japan for JP 61 289 908 A disclose a control method for a rolling mill train whereby—in addition to the features mentioned above in connection with WO 2008/043 684 A1—the following features are implemented:
    a respective current operator-side and a respective current drive-side material modulus is predicted for the strip sections using the temperatures predicted for the time of rolling of the respective strip section in the first roll stand,
    a roll gap of the first roll stand can be influenced on the operator- and drive-side by the adjusting device,
    the material moduli correspond to the control parameters and are used by the adjusting device at the time of rolling of the respective strip section in the first roll stand for parameterizing an operator-side and drive-side roll gap control system, and
    the temperatures of the strip sections for the time of rolling of the respective strip section in the first roll stand are predicted by the strip model using a first prediction horizon.

From DE 35 15 429 A1 it is known to take account of the temperature distribution of the strip to be rolled across the width of the strip for determining the anticipated roll wear.

EP 2 301 685 A1 discloses a control method for (among other things) a rolling mill train,
    wherein a strip section temperature is determined in each case for strip sections upstream of a first roll stand of the rolling train,
    wherein the strip section temperatures for the time of rolling of the respective strip section in the first roll stand are predicted by a strip model on the basis of the temperatures determined,
    wherein, using the predicted temperatures of the strip sections, at least one respective control parameter for rolling of the strip sections in the first roll stand is determined,
    wherein an adjusting device acting on the first roll stand of the rolling mill train is controlled during rolling of the respective strip section taking the respective control parameter determined into account.

SUMMARY

One potential object is to take into account, during rolling of the strip, the strip temperature characteristic, particularly if the deformability of the strip—e.g. because of temperature and/or strain hardening differences—also varies across the width of the strip.

The inventors propose a control method for a rolling mill train in which:
the first prediction horizon corresponds to a plurality of strip sections to be rolled in the first roll stand,
for the first prediction horizon, a manipulated variable characteristic is set for the adjusting device,
a profile of a roll gap formed by work rolls of the first roll stand is influenced using the manipulated variable characteristic,
by a roll stand model, a respective roll gap profile is predicted for the first roll stand using the predicted temperatures of the strip sections and the manipulated variable characteristic set for the strip sections corresponding to the first prediction horizon, said profile being formed by the work rolls of the first roll stand at the time of rolling of the respective strip section,
the manipulated variable characteristic set is optimized on the basis of the roll gap profile predicted for the strip sections and of a respective setpoint profile, and
the current value of the optimized manipulated variable characteristic corresponds to the control parameter and is pre-set as the manipulated variable for the adjusting device.

This arrangement in particular enables the temperature characteristic of the strip to be taken into account for adjusting the roll gap profile.

The procedure according to the proposal can be improved still further by providing that:
the strip model incorporates a material model by which an anticipated material property other than the temperature is predicted in each case for the strip sections to be rolled in the first roll stand for the time of rolling of the respective strip section in the first roll stand, and
the predicted material properties are taken into account for determining the at least one control parameter.

In many cases it may suffice to predict the temperatures for the strip sections as scalar variables. It is often advantageous, however, if the strip section temperatures predicted by the strip model are spatially resolved in the strip width direction. In this case, the temperatures determined for the strip sections are preferably already spatially resolved in the strip width direction.

The procedure according to the proposal can be improved still further by:
feeding at least the predicted temperatures into a rolling force model,
predicting the rolling force required for rolling the respective strip section in the first roll stand by the rolling force model using the predicted temperatures for the strip sections corresponding to the first prediction horizon, and
predicting the roll gap profiles by the roll stand model using the predicted rolling forces.

The adjusting device for influencing the roll gap profile can be implemented as required. In particular, roll bending and/or roll shifting are possible options. The adjusting device preferably comprises a roll cooling device. The roll cooling device can be controllable in a spatially resolved manner in particular in the strip width direction.

It is possible for the control method also to be implemented with a second prediction horizon for a second roll stand downstream of the first roll stand of the rolling mill train. In this case the strip sections are rolled in the first roll stand from a first entry thickness to a first exit thickness and, in the second roll stand, from a second entry thickness to a second exit thickness.

It is possible for the first exit thickness and/or the second entry thickness to be determined for specific strip sections. In particular, this procedure allows load redistribution between the first and the second roll stand in ongoing rolling operation.

Although the prediction horizon for the second roll stand can be determined as required, it must however—similarly to the prediction horizon for the first roll stand—be dimensioned so as to correspond to a plurality of strip sections, i.e. so that a plurality of strip sections are rolled in the second roll stand during the prediction horizon for the second roll stand. The second prediction horizon is preferably dimensioned such that, during the second prediction horizon, a plurality of strip sections are rolled both in the first and in the second roll stand. In particular the prediction horizons for the first and the second roll stand are dimensioned such that the difference between the prediction horizons corresponds to the time required by a strip section to travel from the first roll stand to the second roll stand. The prediction horizons can be based, so to speak, on the same point upstream of the first roll stand.

Models for basic materials industry plants are usually prone to error because of the complexity of the operations to be modeled, and also because only limited data acquisition is possible. In order to correct such errors in real time it is preferably provided that:
the strip model and/or another model used in the context of determining the at least one control parameter can be parameterized by a model parameter,
in addition to variables determined in the context of determining the at least one control parameter using the parameterizable model, real-time functional dependences of the determined variables on the model parameter are determined,
an expected value for a measured value and a functional dependence of the expected value on the model parameter are determined for the strip sections in real time using the variables determined by the parameterizable model,
a corresponding measured value is acquired for the strip sections in real time by a measuring device disposed on, upstream or downstream of the first roll stand,
the model parameter is re-determined on the basis of the measured value, the expected value and the functional dependence of the expected value on the model parameter,
the parameterizable model is re-parameterized on the basis of the re-determined model parameter, and
the variables already determined for the strip sections in the context of determining the at least one control parameter using the parameterizable model are corrected in real time.

This ensures in particular that the error-prone model can be adapted during ongoing operation, i.e. during rolling of the strip sections.

The inventors also propose a computer program. Processing of the machine code by the control computer causes the control computer to carry out a control method.

The inventors also propose a control computer. The control computer is carries out the control method during ongoing operation.

The inventors also propose a rolling mill train. A strip-rolling train comprising at least a first roll stand is equipped with the proposed control computer.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
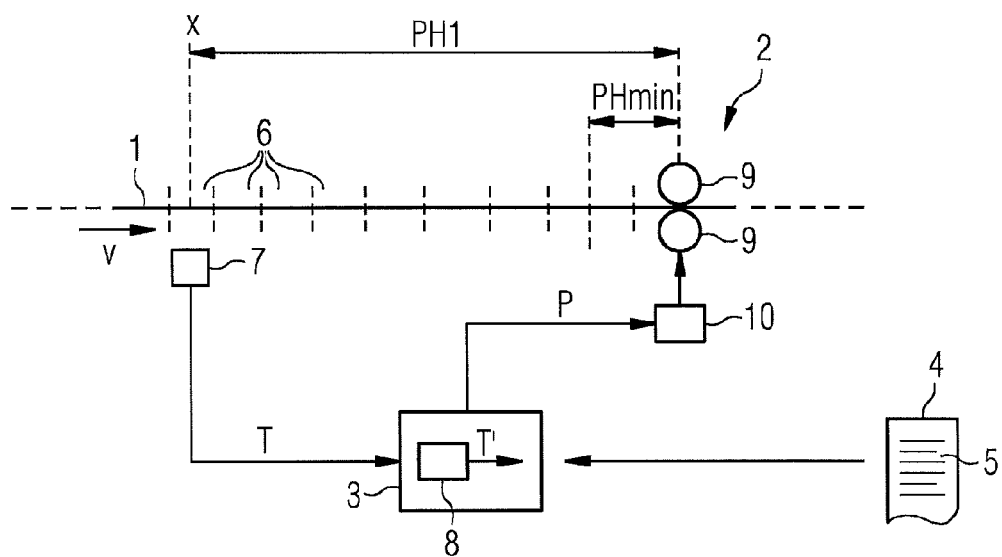
FIG. 1 shows a rolling mill train.

Reference will now be made in detail to the preferred embodiments of the present invention, examples of which are illustrated in the accompanying drawings, wherein like reference numerals refer to like elements throughout.

As shown in FIG. 1, a rolling mill train for rolling a strip 1 has a first roll stand 2. The first roll stand 2 can be the only stand of the rolling mill train. Alternatively, further stands may be present. The strip 1 is generally a metal strip, e.g. a steel, aluminum, magnesium or copper strip. Other metals and metal alloys are also possible.

The rolling mill train and therefore also the first roll stand 2 are controlled by a control computer 3. The control computer 3 is programmed with a computer program 4. The computer program 4 consists of machine code 5 which can be processed directly by the control computer 3. Processing of the machine code 5 by the control computer 3—i.e. operation of the control computer 3—causes the control computer 3 to carry out at least one—or possibly a plurality—of the control methods which will be explained in greater detail in connection with FIGS. 2 to 19.

Figure 2:
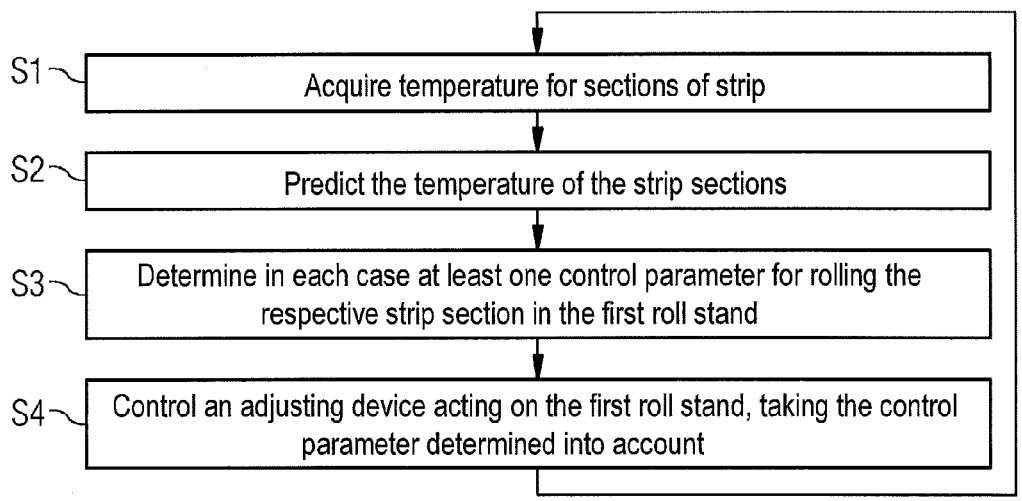
FIGS. 2 and 3 show flow charts.

As shown in FIG. 2, in S1 the control computer 3 receives a respective temperature T for strip sections 6 of the strip 1. It is possible (and even usual) for the temperatures T of the strip sections 6 as shown in FIG. 1 to be metrologically acquired using a temperature measuring device 7. Alternatively, they can be determined in other ways—in particular by calculation.

However, irrespective of how the temperatures T of the strip sections 6 are determined, in S1 they are determined for a location x upstream of a first roll stand 2. The temperature T is therefore representative of the respective temperature T of the respective strip section 6 at a point in time when the strip section 6 is still upstream of the first roll stand 2.

On the basis of the programming with the computer program 4, the control computer 3 implements among other things a strip model 8. The strip model 8 uses mathematical physics equations to model at least the temperature behavior of the strip 1. In particular, a thermal conduction equation is solved by the strip model 8 for the strip sections 6. For the purposes of solving the thermal conduction equation, in particular the internal thermal conduction within the strip 1 and the interaction of the strip 1 with its environment are taken into account, e.g. the interaction with cooling and heating devices, a scale breaker, contact with transport rollers, contact with work rolls 9 of the first roll stand 2, etc. In addition, a phase transition equation coupled with the thermal conduction equation can also be solved if necessary. The corresponding procedures are well known to persons skilled in the art. An advantageous thermal conduction equation is described, for example, in DE 101 29 565 A1 or, with identical content, U.S. Pat. No. 6,860,950 B2. An advantageous phase transition equation is described, for example, in EP 1 711 868 B1 or, with identical content, U.S. Pat. No. 7,865,341 B2. The strip model 8 can also possibly include further models.

By the strip model 8, in S2 the control computer 3 therefore predicts, on the basis of the determined temperatures T, the temperature of the strip sections 6 for the time of rolling of the respective strip section 6 in the first roll stand 2. The predicted temperature is denoted by the reference character T' to differentiate it from the determined temperature T.

The prediction is made using a prediction horizon PH1, hereinafter referred to as the first prediction horizon PH1. The first prediction horizon PH1 corresponds to the number of time increments over which the strip model 8 predicts the temperature T', a strip section 6 being rolled in the first roll stand 2 during each time increment.

At minimum, the first prediction horizon PH1 comprises a single time increment. A minimum prediction horizon PHmin is therefore determined by the prediction of the temperature of the strip sections 6 being a single time increment ahead. In this case a single strip section 6 is therefore rolled in the first roll stand 2 during the first prediction horizon PH1, namely the immediately preceding strip section 6. However, in many embodiments—and this will be explained in greater detail below—the first prediction horizon PH1 is designed such that during the first prediction horizon PH1 a plurality of strip sections 6 are rolled in the first roll stand 2, e.g. five, eight, ten or even more strip sections 6.

In S3, the control computer 3 uses the predicted temperatures T' of the strip sections 6 to determine at least one control parameter P for the rolling of the respective strip section 6 in the first roll stand 2. In S4, the control computer 3 controls an adjusting device 10. The adjusting device 10 acts on the first roll stand 2. The adjusting device 10 is controlled during rolling of the respective strip section 6 taking into account the control parameter P determined for the strip section 6 currently to be rolled.

The FIG. 2 procedure will now be explained again using an example.

It is assumed that a particular temperature T is determined, e.g. acquired using measuring instruments, at a particular point in time for a particular strip section 6 (S1). The corresponding strip section 6 is tracked as it passes through the rolling mill train. The temperature T' expected for the corresponding strip section 6 is continuously taken into account (S2), the model-supported temperature prediction being at least one time increment ahead of the location of the corresponding strip section 6. At the point in time when the strip section 6 in question is directly upstream of the first roll stand 2, i.e. the immediately preceding strip section 6 is being rolled in the first roll stand 2, the control parameter P is determined for said strip section 6. The control parameter P is therefore known early enough to the control computer 3 to enable the control computer 3 to take the control parameter P into account for controlling the adjusting device 10 when the strip section 6 in question is rolled in the first roll stand 2. Alternatively, the determination of the control parameter P includes the predicted temperature T' of the strip section 6 immediately upstream of the first roll stand 2 or—if the first prediction horizon PH1 is greater than the minimum prediction horizon PHmin— additionally the predicted temperatures T' of further strip sections 6.

The FIG. 2 procedure is generally carried out in a clocked manner, e.g. at between 0.1 and 0.5 second intervals, generally at approx. 0.2 to 0.3 second intervals. With each clock pulse, the temperature T is determined for a new strip section 6 and thus known to the control computer 3. The temperature is then predicted on the basis of a model.

For many embodiments, the control computer 3 also requires the predicted temperatures T' and possibly other characteristics of other strip sections 6 and/or predicted characteristics of the first roll stand 2. Insofar as strip sections 6 to be rolled after the strip section 6 in question are concerned, their temperatures and characteristics are known to the control computer 3 if they are within the first prediction horizon PH1. For example, in the case of a first prediction horizon PH1 of eight strip sections 6, at the time when the temperature T is determined for a particular strip section 6, the expected temperatures T' of the seven subsequent strip sections 6 are already known to the control computer 3 on the basis of the prediction already carried out previously. In other words, in the case of a first prediction horizon PH1 of eight strip sections 6, the predicted temperatures T' of the eight strip sections 6 upstream of the first roll stand 2 are known at each point in time. They can therefore be taken into account for determining the control parameter P for the next strip section 6 to be rolled in the first roll stand 2. Insofar as strip sections 6 to be rolled before the strip section 6 in question are concerned, their temperatures and characteristics are known to the control computer 3 from past history.

A possible embodiment of the proposed control method will now be explained in greater detail in connection with FIG. 3, wherein the first prediction horizon PH1 is dimensioned such that a plurality of strip sections 6 are rolled in the first roll stand 2 during the first prediction horizon PH1. Purely by way of example it will be assumed in this context that the first prediction horizon PH1 corresponds to eight strip sections 6. However, this dimensioning is only for illustrative purposes and is not therefore to be understood as a mandatory limitation to eight strip sections 6.

Figure 3:
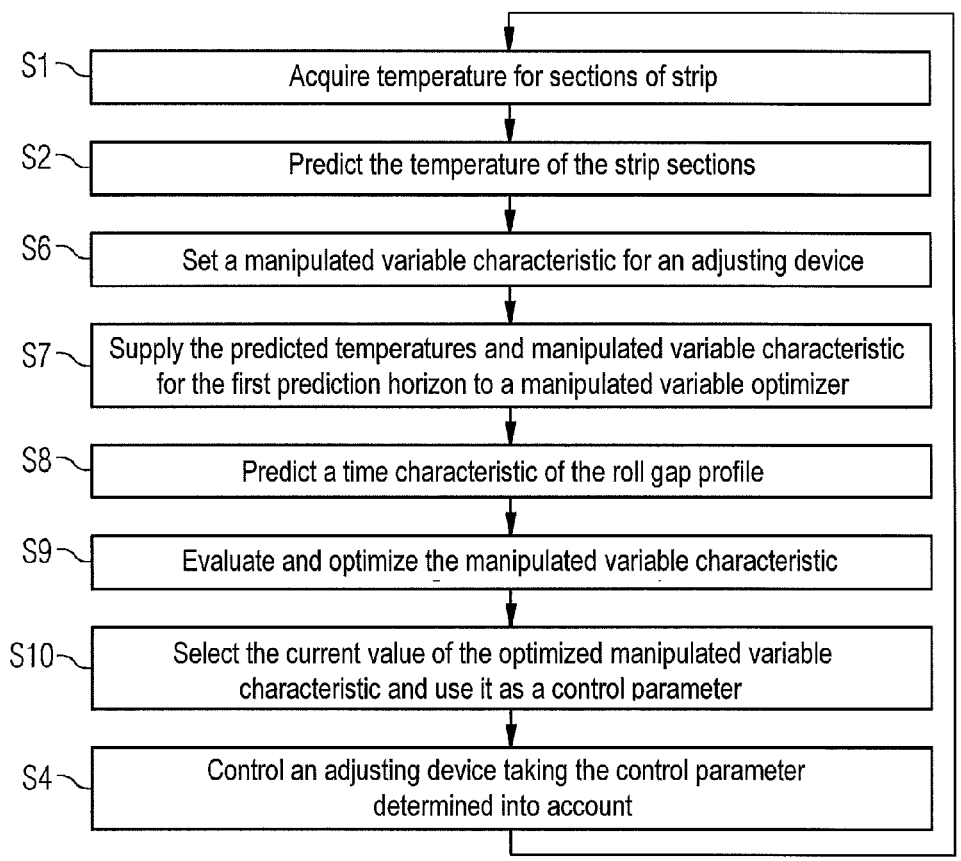
Figure 4:
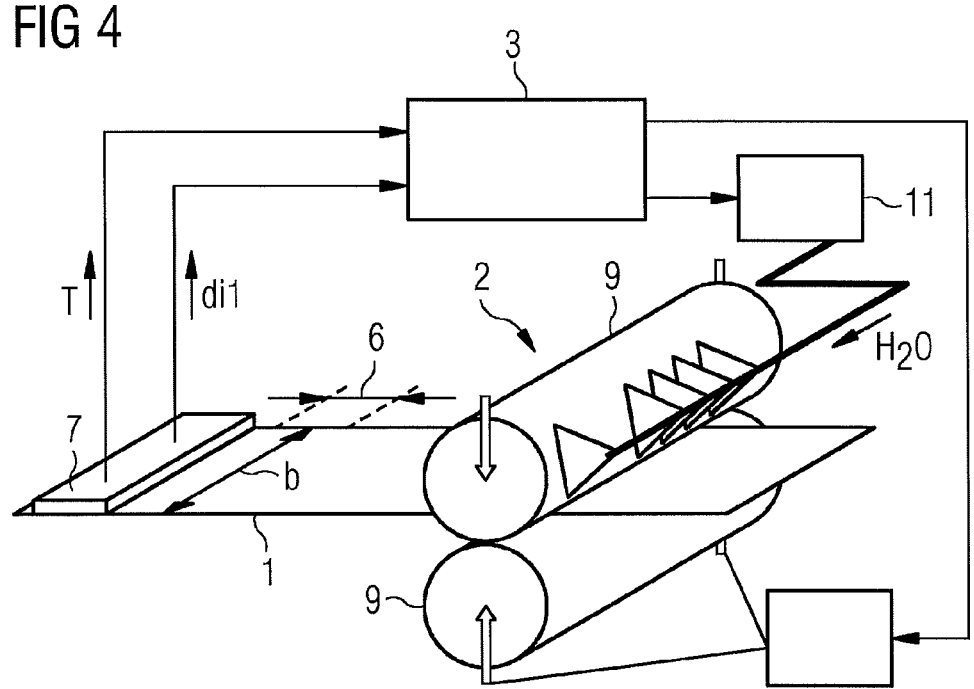
FIG. 4 shows a first roll stand.

In FIG. 3, S1, S2 and S4 are present as is also the case in FIG. 2. S1 and S4 require no further explanation. With regard to S2 it must only be mentioned that, as part of S2 in FIG. 3, S2 is executed using the first prediction horizon PH1 of a plurality of strip sections 6—eight purely by way of example. During S2 in FIG. 3, the corresponding temperatures T' are therefore predicted for all the strip sections 6 located up to eight strip sections 6 upstream of the first roll stand 2 at the time in question. S3 in FIG. 2 is implemented in FIG. 3 by S6 to S10. In particular, in the context of the embodiment in FIG. 3 it is assumed that the adjusting device 10 is designed such that it can be used to adjust the roll gap profile—i.e. the distance between the work rolls 9 of the first roll stand 2 as viewed across the width. For this purpose the adjusting device 10 can be implemented, for example, as a roll shifting device and/or as a roll bending device. As shown in FIG. 4, the adjusting device 10 can comprise— possibly solely, or alternatively in addition to a roll shifting and/or roll bending device—a roll cooling device 11. As illustrated in FIG. 4, the roll cooling device 11 can be controllable in a spatially resolved manner in particular in the strip width direction.

In S6, in accordance with FIG. 3, a manipulated variable characteristic S(t) is set for the adjusting device 10, i.e. the time characteristic of the manipulated variable S is set. The manipulated variable characteristic S(t) is set for the first prediction horizon PH1—i.e. the strip section 6 in question and the seven strip sections 6 following the strip section 6 in question. The roll gap profile is influenced—according to the nature of the adjusting device 10—by the manipulated variable characteristic S(t). In particular, the thermal camber of the work rolls 9, for example, can be adjusted by the roll cooling device 11.

Figure 5:
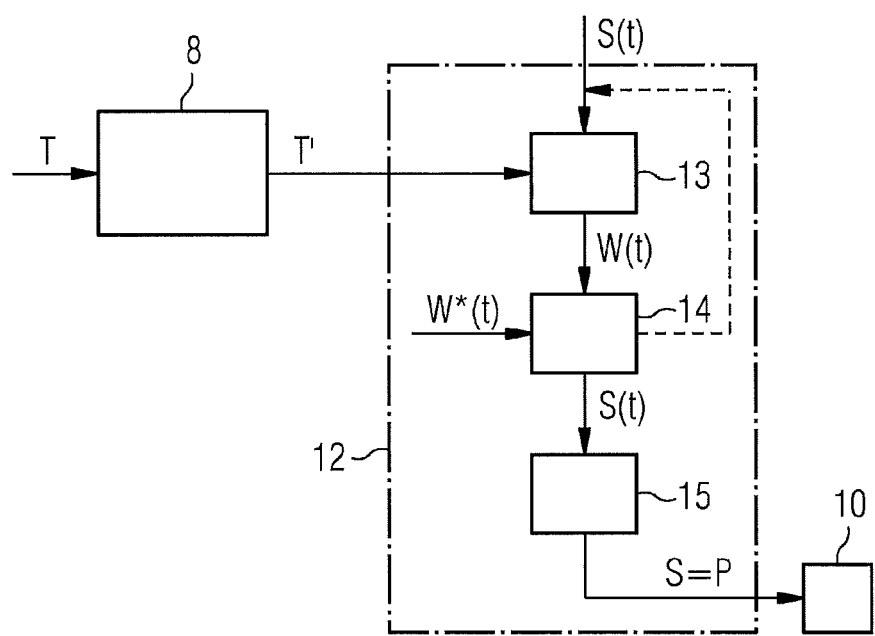
FIG. 5 shows a block diagram.

In S7
  the predicted temperatures T' of the strip sections 6 in the first prediction horizon PH1 at the time of rolling of the respective strip section 6 in the first roll stand 2, and
  the manipulated variable characteristic S(t) for the first prediction horizon PH1 are fed to a manipulated variable optimizer 12—see FIG. 5.

The manipulated variable optimizer 12 is a software block implemented by the control computer 3. It comprises, among other things, a roll stand model 13. The roll stand model 13 models in particular the thermal camber of the work rolls 9 and the wear of the work rolls 9 resulting from contact of the work rolls 9 with the strip 1. The roll stand model 13 additionally models the effect of the manipulated variable characteristic S(t) on the roll gap, in particular the effect of the roll cooling device 11 on the thermal camber.

The roll stand model 13 predicts a roll gap profile characteristic W(t) over time as an output variable in S8. In S8, the roll stand model 13 therefore predicts the resulting roll gap profile W for the respective strip section 6 for each strip section 6 within the first prediction horizon PH1. The roll stand model 13 determines the roll gap profile characteristic W(t) using the manipulated variable characteristic S(t) fed into it and the predicted temperatures T' of the strip sections 6.

As shown in FIGS. 3 and 5, the roll gap profile characteristic W(t) is evaluated in an evaluator 14 and optimized by the evaluator 14 in S9. If optimization so requires, the roll stand model 13 can if necessary be re-invoked following modification of the set manipulated variable characteristic S(t). This is indicated by the dashed line in FIG. 5.

To optimize the manipulated variable characteristic S(t), the roll gap profile characteristic W(t) determined is compared with a setpoint profile characteristic W*(t). The setpoint profile characteristic W*(t) can be constant. Irrespective of whether or not the setpoint profile characteristic W*(t) is constant, the primary objective of optimization is to ensure flatness of the strip 1. A maximally uniform profile should be rolled where possible as a matter of secondary importance.

Temperature measurement as shown in FIG. 4 is preferably linked to strip thickness measurement and/or strip profile measurement. In this case the setpoint profile W* for the respective strip section 6 can be determined in a profile and flatness model on the basis of the measured strip thickness and measured strip thickness profile respectively.

The optimized manipulated variable characteristic S(t) is fed to a selector 15 as shown in FIG. 5. In S10, the selector 15 selects the current value of the optimized manipulated variable characteristic S(t), i.e. the value of the optimized manipulated variable characteristic S(t) that was determined for the next strip section 6 to be rolled. This value S corresponds to the control parameter P of S4 and is specified as the manipulated variable for the adjusting device 10 in S4 of FIG. 3.

It is possible for the manipulated variable optimizer 12 to "forget" the optimized manipulated variable characteristic S(t) determined in the course of FIG. 3. However, the manipulated variable optimizer 12 preferably "notes" the optimized manipulated variable characteristic S(t) and uses it in the next cycle, i.e. when the next strip section 6 is being handled, as the set manipulated variable characteristic S(t) for the coinciding strip sections 6.

The procedure explained above in connection with FIGS. 3 to 5 can be further improved by an embodiment of the kind explained below in connection with FIGS. 6 and 7.

Figure 6:
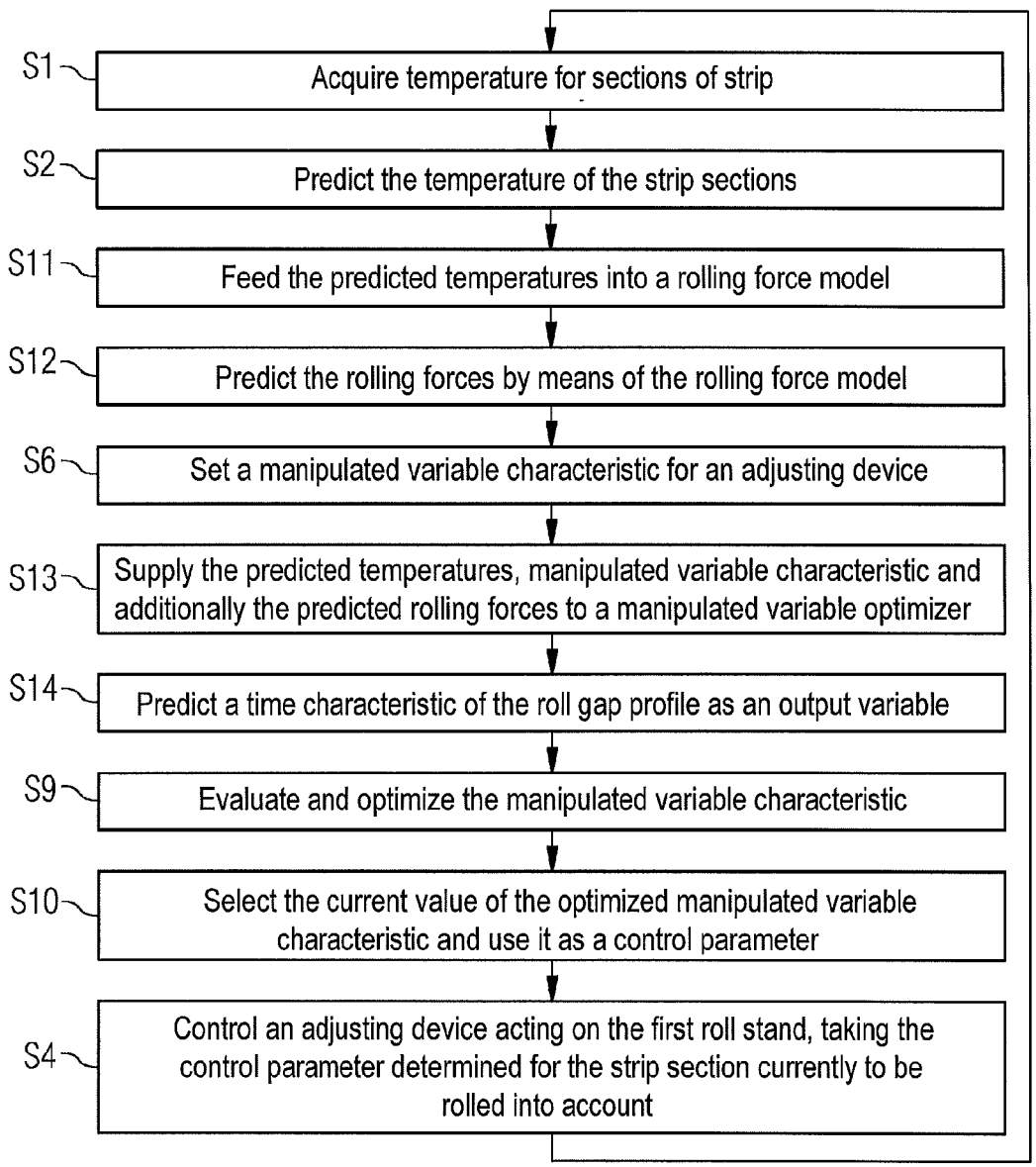
FIG. 6 shows a flow chart.
Figure 7:
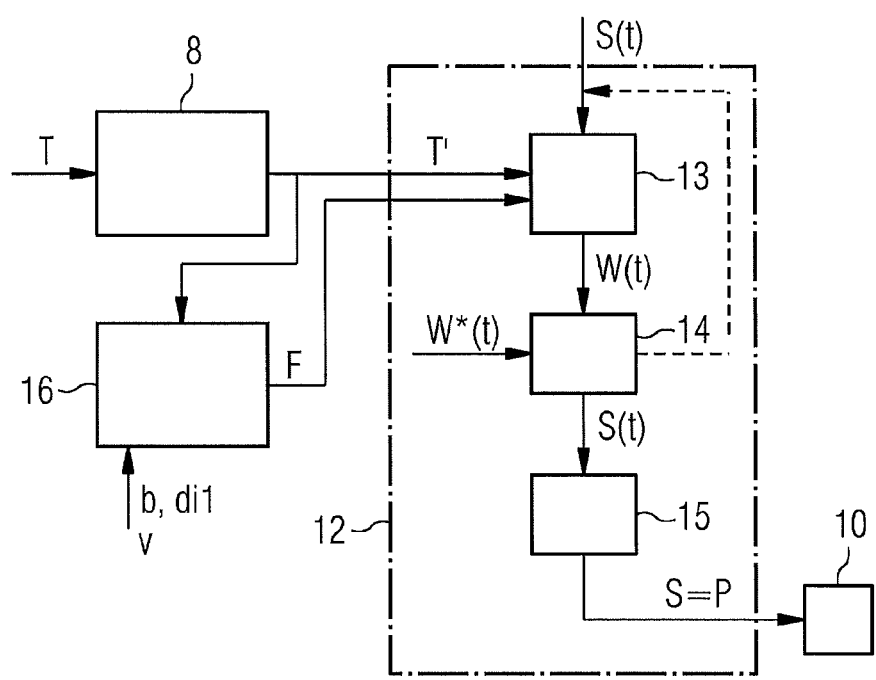
FIG. 7 shows a block diagram.

FIG. 6 is a modification of FIG. 3, FIG. 7 a modification of FIG. 5. Only the differences between the respective FIGS will therefore be examined in greater detail below.

FIG. 6 differs from FIG. 3 in that it comprises additional S11 and S12. In S11, the temperatures T' predicted by the strip model 8 are fed into a rolling force model 16. In S12, rolling forces F are predicted for the strip sections 6 in question by the rolling force model 16 using the predicted temperatures T'. The rolling force model 16 therefore determines, for each strip section 6 to be rolled within the first prediction horizon PH1, what rolling force F is required in order to roll the corresponding strip section 6 from a first entry thickness di1 to a desired first exit thickness do1. The other variables required for this purpose, such as the chemical composition of the strip 1, the first entry thickness di1, the strip width b, the rolling velocity v, entry- and exit-side tensions, etc., are likewise fed into the rolling force model 16.

According to FIG. 6, S7 and S8 in FIG. 3 are additionally replaced by S13 and S14. In S13, the predicted temperatures T' and the set manipulated variable characteristic S(t) are fed to the manipulated variable optimizer 12—as is also the case in S7 of FIG. 3. Also fed to the manipulated variable optimizer 12 in S13 are the predicted rolling forces F. In S14, the manipulated variable optimizer 12 predicts, as part of its roll stand model 13, similarly to S8 in FIG. 3, the respective roll gap profile W for the strip sections 6 to be rolled in the first roll stand 2 in the first prediction horizon PH1. However, in S14 the predicted rolling forces F are additionally taken into account for predicting the roll gap profile characteristic W(t).

Figure 8:
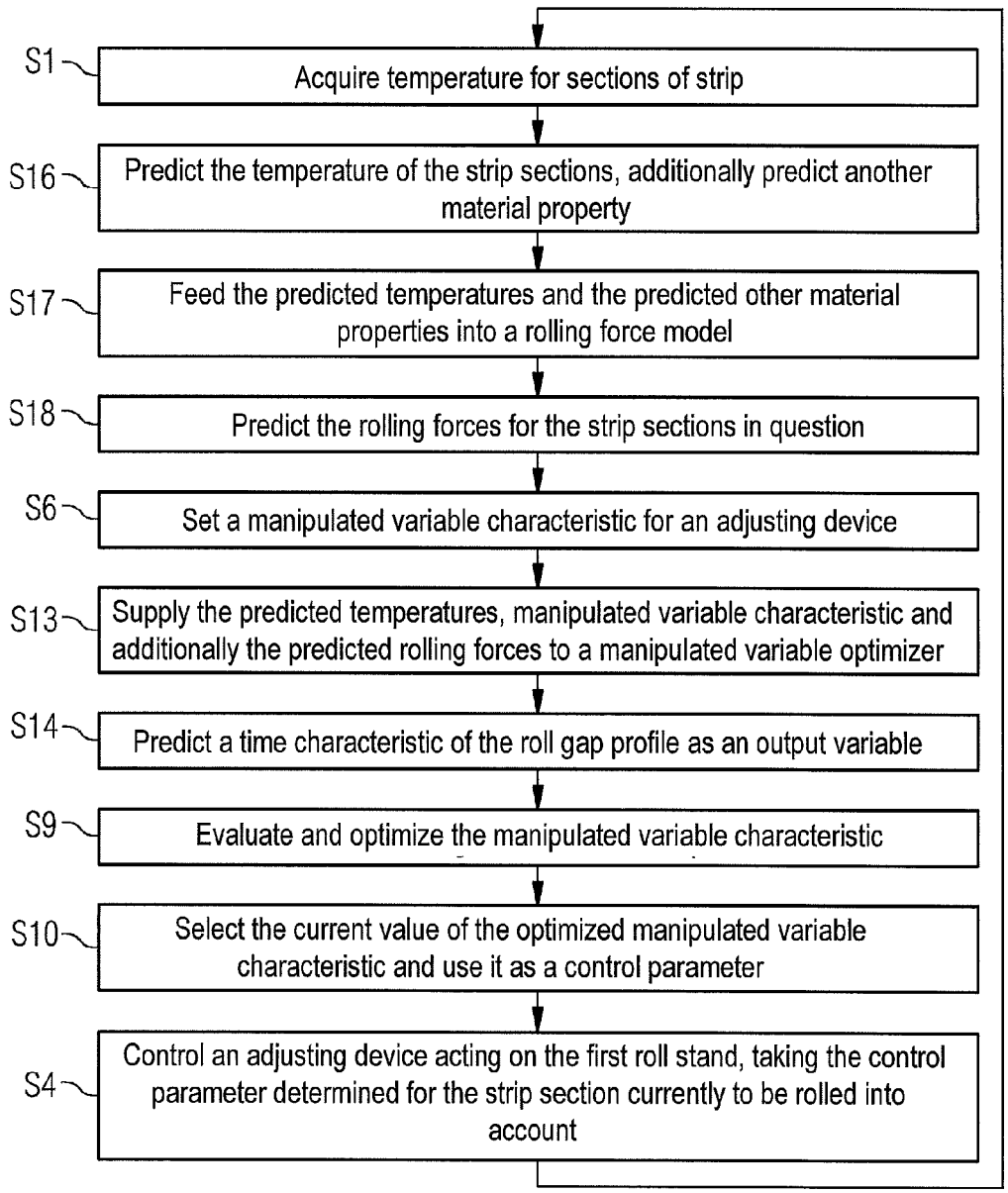
FIG. 8 shows a flow chart.
Figure 9:
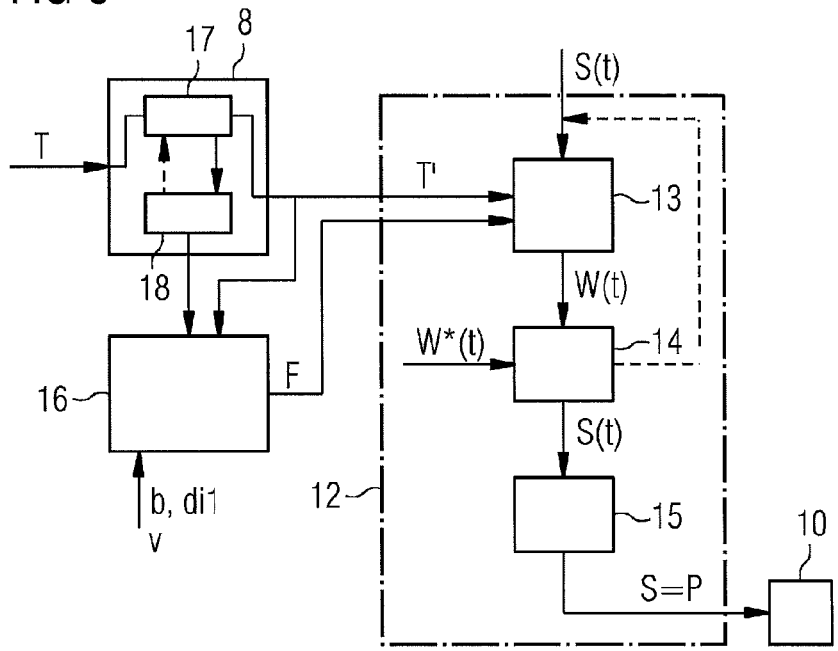
FIG. 9 shows a block diagram.

The procedure in FIGS. 6 and 7 can be improved still further by the procedure in FIGS. 8 and 9.

According to FIG. 8, S2, S11 and S12 of FIG. 6 are replaced by S16 to S18. The strip model 8 as shown in FIG. 9 additionally has a temperature model 17 and a material model 18. In S16, the temperatures T' of the strip sections 6 are predicted by the temperature model 17—as previously in S2 by the strip model 8. A further material property which is expected for the respective strip sections 6 to be rolled in the first roll stand 2 in the first prediction horizon PH1 is additionally predicted by the material model 18 in S16 during rolling of the respective strip section 6 in the first roll stand 2. The further material property is—self-evidently—different from the temperature T', but affects the rolling force F required for rolling the respective strip section 6. For example, the further material property can be a degree of phase change, a material hardening, a recrystallization or a grain structure.

If necessary, there can be uni- or bidirectional coupling between the temperature changes and the changes in the other material property. In the former case, the temperature characteristic of the strip section 6 considered is first determined by the temperature model 17 during the first prediction horizon PH1. The determined temperature characteristic over time is then pre-set for the material model 18, and finally the further material property is determined on the basis of the material model 18. In the latter case, the predicted temperature T' and the predicted further material property of the respective strip section 6 in question are determined in a stepwise coupled manner.

In S17, the corresponding other material properties for the corresponding strip sections 6 are also fed into the rolling force model 16—in addition to the values and variables mentioned in S11. In S18, the rolling force model 16 predicts the required rolling forces F, in addition also taking the other material properties into account.

As the other material properties affect the predicted rolling forces F, these in turn affecting the roll gap profile W and this in turn affecting the optimized manipulated variable characteristic S(t), in the procedure in FIGS. 8 and 9 the control computer 3 consequently also takes into account the predicted other material properties in determining the manipulated variable S currently to be output to the adjusting device 10, i.e. the corresponding control parameter P.

The determination of a manipulated variable S by which the profile of the roll gap formed by the work rolls 9 is influenced was explained above as an example of determining a control parameter P. In the following, an embodiment of the proposed control method will be explained in connection with FIGS. 10 and 11. This embodiment can be implemented discretely. Alternatively, the embodiments in FIGS. 3 to 9 can be additionally implemented.

Figure 10:
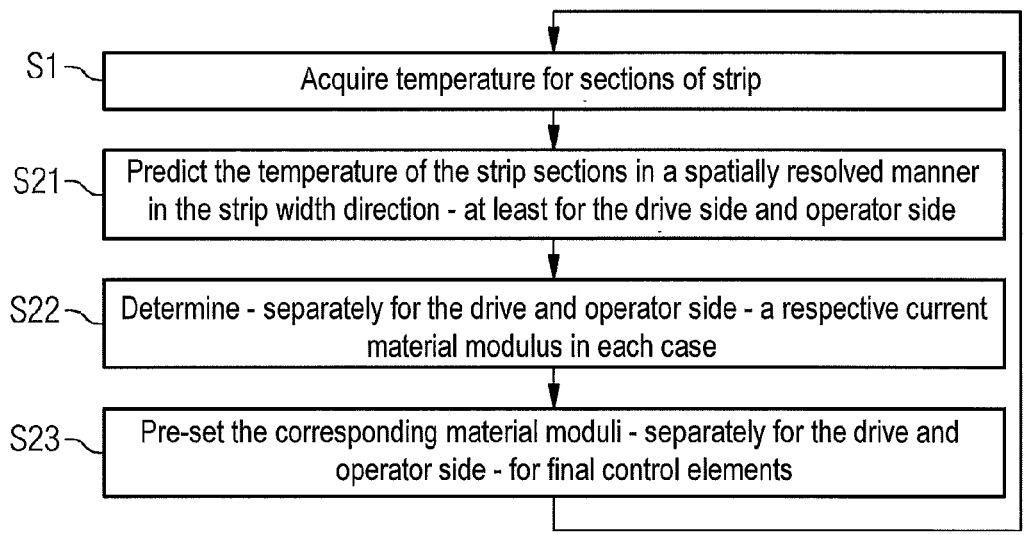
FIG. 10 shows a flow chart.

FIG. 10 is a possible embodiment of FIG. 2, but with S2 to S4 of FIG. 4 being replaced by S21 to S23.

In S21—similarly to S2—the temperature T' of the corresponding strip section 6 is predicted. However, unlike S2 of FIG. 2, the predicted temperature T' in the procedure as shown in FIG. 10 is spatially resolved in the strip width direction. The spatial resolution is such that a separate temperature T' is predicted at least for the drive side (DS) and the operator side (OS).

In the FIG. 10 embodiment, the first prediction horizon PH1 can be small. It can even correspond to the minimum prediction horizon PHmin. Alternatively, the first prediction horizon PH1 can be larger.

In S22, a respective current material modulus M which is expected for the time when the corresponding strip section 6 is rolled in the first roll stand 2 is predicted in determination blocks 19—separately for the operator and drive side—using the temperatures T' predicted for the respective side of the first roll stand 2 for the respective strip section 6. The respective material modulus M is essentially representative of the strength or rather deformability of the corresponding strip section 6 on the corresponding side of the first roll stand 2.

By the adjusting device 10—namely at least independently of one another within limits—a final control element 20 (e.g. a hydraulic cylinder unit) can be controlled, by which the rolling force F can be applied to the work rolls 9 on the drive and operator side, thereby influencing the roll gap. According to FIGS. 10 and 11, in S23 the corresponding material moduli M are pre-set for the final control elements 20 at the time when the corresponding strip section 6 is being rolled in the first roll stand 2. They are therefore used at the corresponding time for operator- and drive-side roll gap control parameterization.

Figure 11:
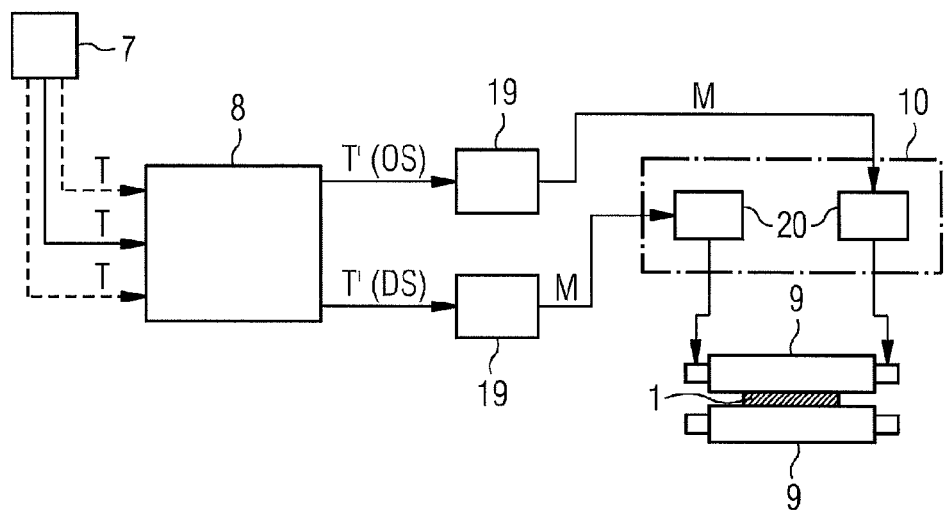
FIG. 11 shows a block diagram.
Figure 12:
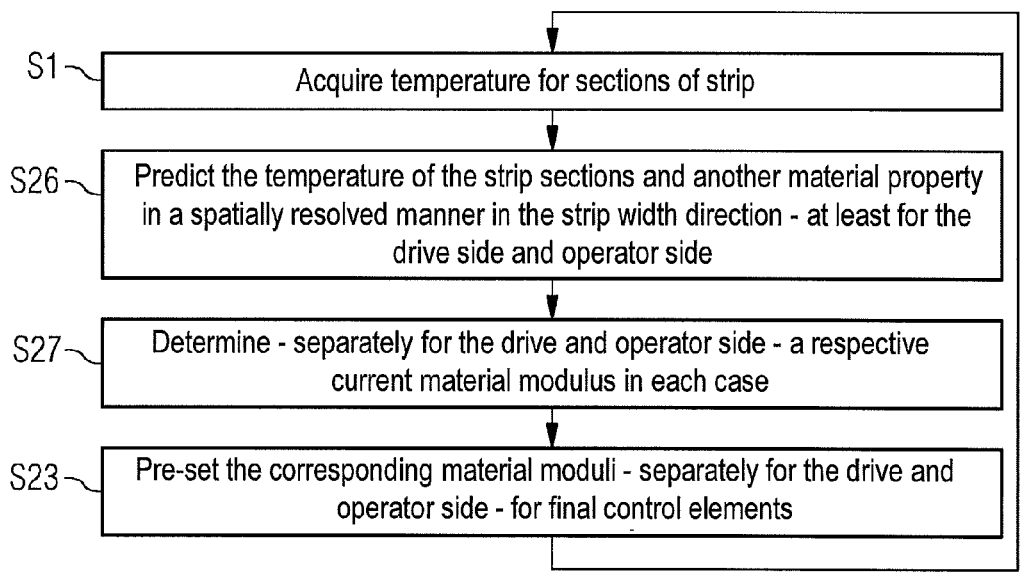
FIG. 12 shows a flow chart.
Figure 13:
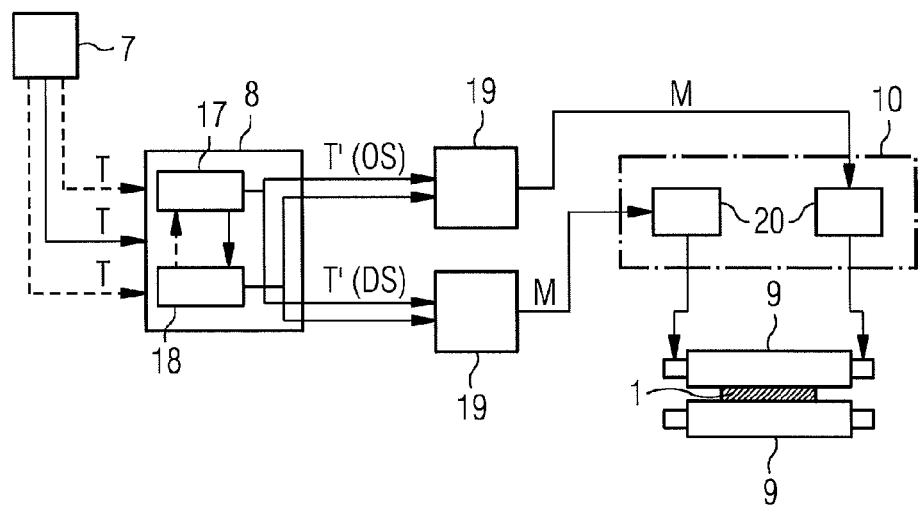
FIG. 13 shows a block diagram,
FIGS. 14 and 15 each show a strip section at different times
Figure 14:
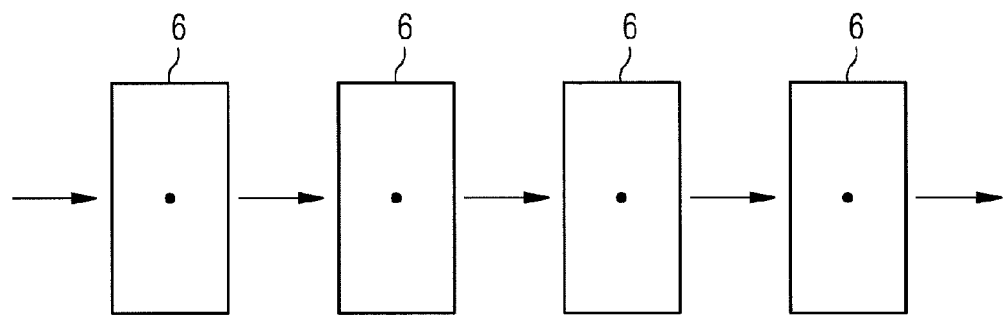

Similarly to the supplementing of FIGS. 6 and 7 with the embodiment in FIGS. 8 and 9, the embodiment in FIGS. 10 and 11 can be extended according to FIGS. 12 and 13. As shown in FIG. 12, S21 and S22 of FIG. 10 are replaced by S26 and S27. As shown in FIG. 13, the strip model 8 additionally includes the temperature model 17 and the material model 18.

In S26—similarly to S21 of FIG. 10—the operator-side and drive-side temperature T' of the corresponding strip section 6 is predicted by the temperature model 17. In S26,—similarly to S16 of FIG. 8—another material property of the corresponding strip section 6 at the time of rolling in the first roll stand 2 is predicted by the material model 18. However, as shown in FIG. 13, the other material property is additionally predicted separately for the drive side and the operator side of the first roll stand 2.

As shown in FIG. 13, the respective other material property is also fed to the determination blocks 19. The determination blocks 19 therefore determine the respective material modulus M not only using the respective predicted temperatures T' but also using the respective predicted other material properties.

In the context of the procedure in FIGS. 3 to 9, it can suffice to determine the temperatures T' predicted for the strip sections 6 as scalars, i.e. a single value for each strip section 6. This is indicated for one of the strip sections 6 in FIG. 14, which shows the location of the corresponding strip section 6 for different times, the temperatures T' for the respective time being indicated by a black circle in each case. If the temperature T' is predicted in a scalar manner, it self-evidently also suffices to carry out the (first-time) determination of the temperatures T' within the corresponding strip section 6 in a non-spatially-resolved manner in the strip width direction. However, in the case of the procedure of FIGS. 3 to 9, spatially resolved determination of the temperature T and prediction of the temperature T' is self-evidently also possible.

Figure 15:
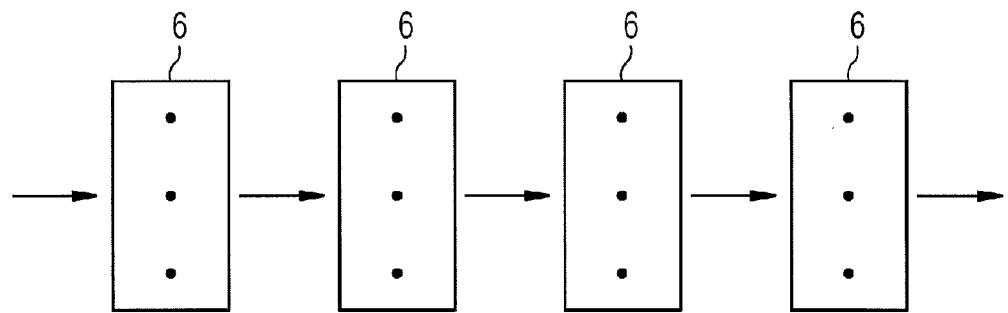

For the procedure of FIGS. 10 to 13, on the other hand, it is necessary for the temperatures T' (and possibly also other material properties) of the strip sections 6 predicted by the strip model 8 to be spatially resolved in the strip width direction. In general it is sufficient to predict the temperature T' for two points (i.e. left and right side of the strip) or—as shown in FIG. 15—for three points (left side, right side and center of the strip). However, more precise spatial resolution is alternatively possible.

It this case it can also possibly suffice to carry out the first-time determination of the temperature T—i.e. at the start of the first prediction horizon PH1—in a non-spatially-resolved manner in the strip width direction. This may be possible if, for example, the strip 1 initially has a uniform temperature T, but has a thickness wedge in the strip width direction and therefore cools more quickly on the thin side than on the thicker side. However, in general the first-time determination of the temperature T of the strip sections 6 is also carried out in this case in a spatially resolved manner in the strip width direction as indicated by the dashed line in FIGS. 11 and 13.

In many cases it suffices for a rolling mill train to have a single roll stand, i.e. only the first roll stand 2 is present. A single roll stand may be sufficient if the strip 1 is cast in a very near-net-shape manner, e.g. by rotating casting rolls. However, in many cases a plurality of roll stands are present. For example, a multi-stand production line generally has six or seven roll stands.

Figure 16:
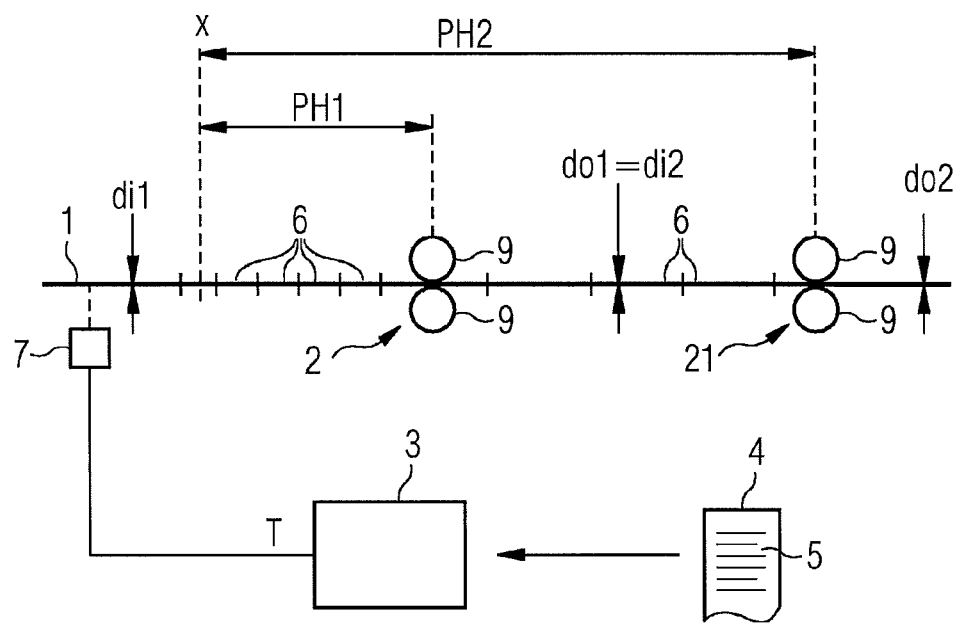
FIG. 16 shows a multi-stand rolling mill train.

If a plurality of stands are present, it is possible for the control method as shown in FIG. 16 also to be carried out for a second roll stand 21. This applies both to the procedure of FIGS. 3 to 9 and also to the procedure of FIGS. 10 to 13 as well as to combined procedures. As shown in FIG. 16, it can also be assumed without loss of generality that the second roll stand 21 is downstream of the first roll stand 2, so that the strip sections 6 are rolled first in the first roll stand 2 and then in the second roll stand 21. It can likewise be assumed without loss of generality that the strip 1 or rather the strip sections 6 are rolled from the first entry thickness di1 to the first exit thickness do1 in the first roll stand 2 and from a second entry thickness di2 to a second exit thickness do2 in the second roll stand 21.

As shown in FIG. 16, the second roll stand 21 is directly downstream of the first roll stand 2. In this case in which no other roll stand is disposed between the first and the second roll stand 2, 21, the second entry thickness di2 is identical to the first exit thickness do1. Otherwise the second entry thickness di2 is less than the first exit thickness do1.

Figure 17:
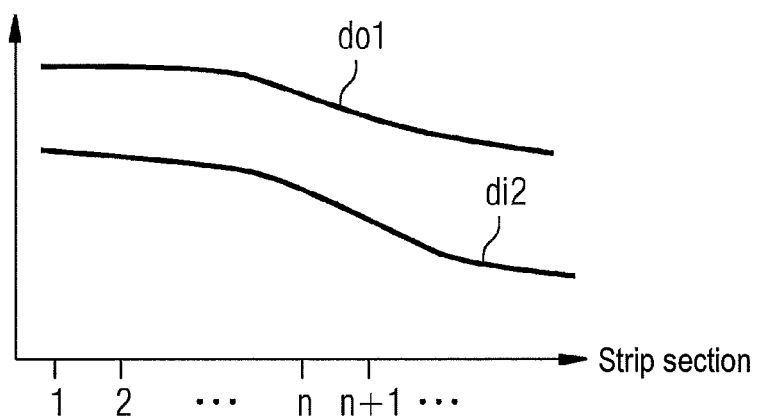
FIG. 17 shows an entry and an exit thickness characteristic.

It is possible for a pass schedule calculation to be performed in advance according to the usual related art procedure for the (as shown in FIG. 16 multi-stage) rolling mill train. In this case the entry thicknesses di1, di2 and the exit thicknesses do1, do2 are determined on a one-off basis and then retained consistently—i.e. for all the strip sections 6 of the strip 1. Alternatively, it is possible to perform the pass schedule calculation dynamically for each strip section 6. In this case it is possible, as shown in FIG. 17, for the first exit thickness do1 and/or the second entry thickness di2 to be determined on a strip section specific basis. In particular, dynamic load distribution during ongoing operation of the rolling mill train is possible in this case.

It is possible to carry out the proposed control method for the second roll stand 21 independently of the control method for the first roll stand 2. In this case a prediction horizon PH2 for the second roll stand 21—hereinafter referred to as the second prediction horizon PH 2—can be determined independently of the first prediction horizon PH1. However, the second prediction horizon PH2 is preferably dimensioned such that a plurality of strip sections 6 are rolled both in the first and in the second roll stand 2, 21 during the second prediction horizon PH2. In particular, the second prediction horizon PH2, as shown in FIG. 16, can be greater by the time required by a strip section 6 to travel from the first roll stand 2 to the second roll stand 21. The first and the second prediction horizon PH1, PH2 in this case start at the same location x upstream of the first roll stand 2.

The previously described control method already yields very good results, but can be improved still further. This will now be explained with reference to FIGS. 18 and 19.

Figure 18:
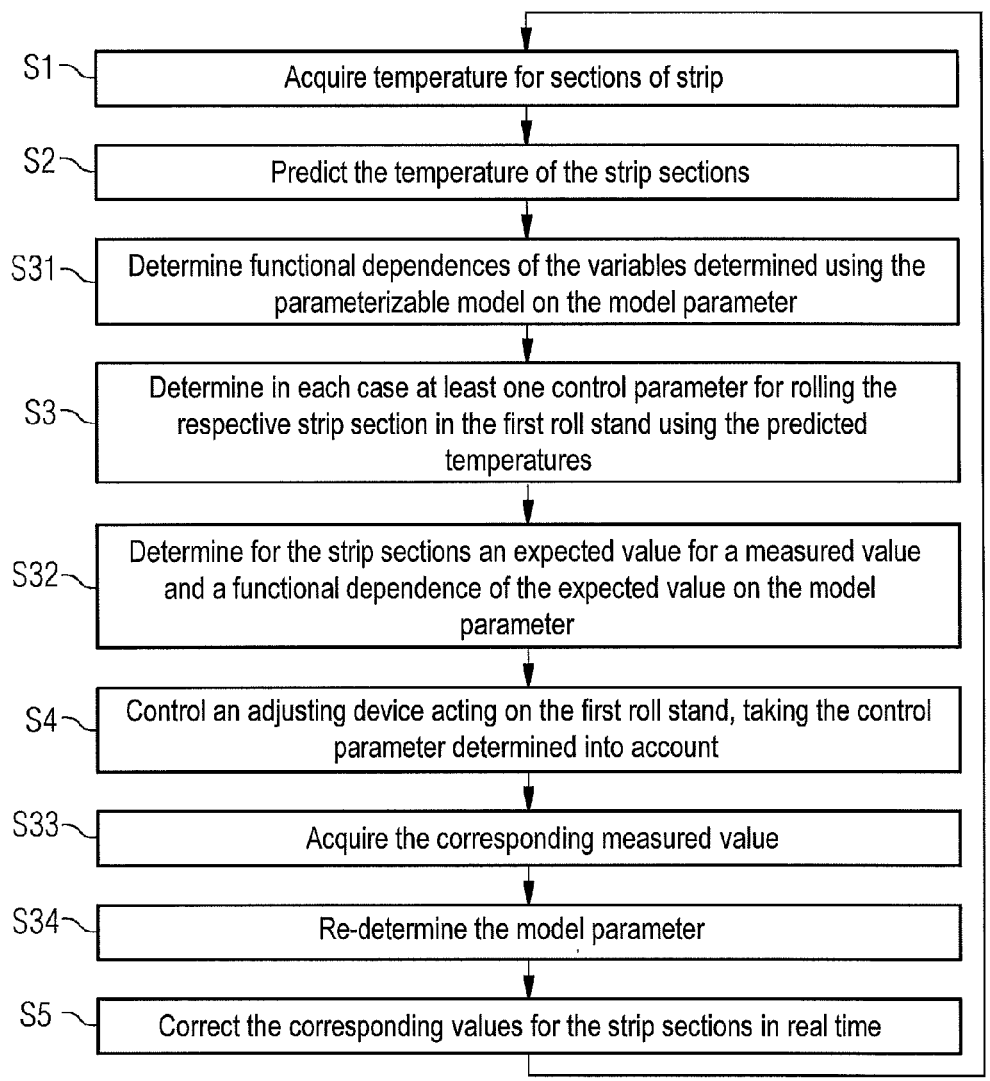
FIG. 18 shows a flow chart.
Figure 19:
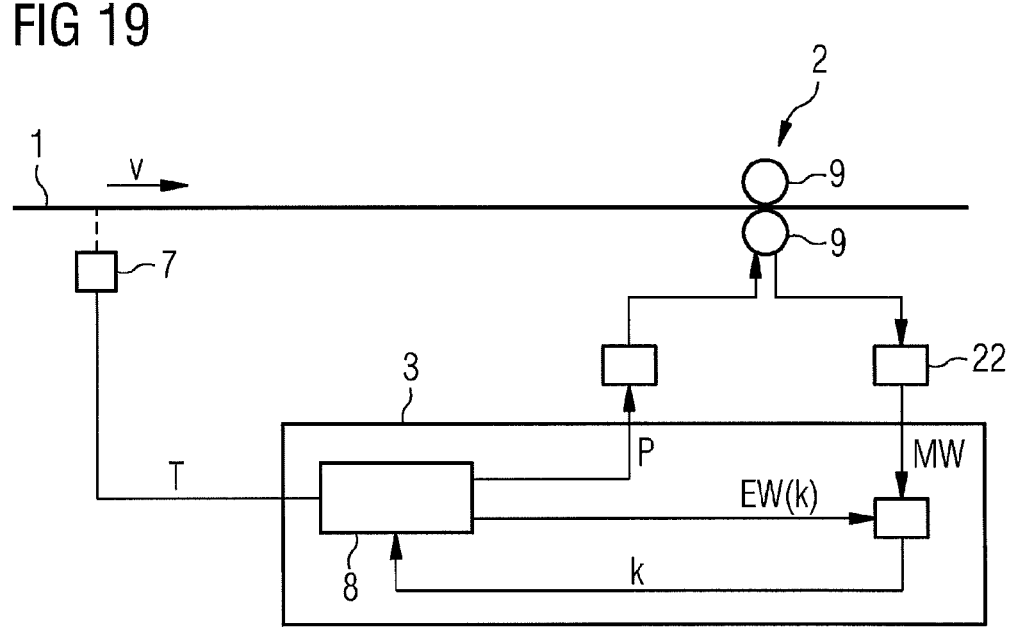
FIG. 19 shows a multi-stand rolling mill train.

As shown in FIG. 18—similarly to FIG. 2—S1 to S4 are present. S1 to S4 can be added to and implemented according to the embodiments in FIGS. 3 to 17. S31 to S35 are additionally present.

In the context of FIG. 18 it is assumed that (at least) one of the models used to determine the at least one control parameter P can be parameterized by a model parameter k. Purely by way of example it will now be assumed that the strip model 8 can be parameterized by the model parameter k. However, this is merely an example. Alternatively, for example, the rolling force model 16, the roll stand model 13, etc. could be parameterized by the model parameter k. A plurality of models can also be parameterizable by a separate model parameter k in each case.

In S31, as shown in FIG. 18, functional dependences of the variables determined directly or indirectly using the parameterizable model 8 on the model parameter k are determined in real time. Said variables are in this context the variables which are required directly or indirectly using the parameterizable model 8 to determine the at least one control parameter P. In the course of S31, functional dependences of the required rolling forces F, the occurring thermal camber of the work rolls 9, the material moduli M, etc. can be determined, for example. As it is present in addition to S2 and S3, S31 is additionally carried out to determine the corresponding variables themselves.

In S32, an expected value EW for a measured value MW is determined in real time for the strip sections 6 using the variables determined by the parameterizable model 8—i.e. the variables which are determined anyway as part of FIGS. 2 to 17 using the parameterizable model 8. A functional dependence of the expected value EW on the model parameter k is additionally determined in S32. The expected value EW can be—for example—the rolling force F with which the corresponding strip section 6 is likely to be rolled, a temperature or a tension distribution in the strip 1.

In S33, the corresponding measured value MW for the respective strip section 6 is acquired in real time by a corresponding measuring device 22. The measuring device 22 can be disposed downstream of the first roll stand 2—e.g. for thickness, tension or temperature measurement (if necessary spatially resolved in the strip width direction). Alternatively, the measuring device 22 can be disposed upstream of the first roll stand 2—e.g. for temperature or tension measurement (if necessary spatially resolved in the strip width direction). As a further alternative, the measuring device 22 can be disposed on the first roll stand 2 itself—e.g. for rolling force or position determination.

In S34, the model parameter k is re-determined on the basis of the measured value MW, the associated expected value EW and the functional dependence of the expected value EW on the model parameter k, i.e. the corresponding model 8 is re-parameterized, i.e. the corresponding model 8 is adapted. For calculations performed by the parameterizable model 8 following adaptation of the parameterizable model 8, the new, updated model parameter k is used.

In S35, the control computer 3 adjusts the corresponding variables in real time for the strip sections 6 whose temperatures T have already been determined and whose expected temperatures T' and the corresponding control parameters P have already been predicted. The adjustment is possible because the functional dependences on the model parameter k are known.

The proposals have many advantages. In particular, it is easy to implement, operates reliably and delivers superior results.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A control method for a rolling mill train, comprising:
   determining actual temperatures respectively for strip sections of a strip upstream of a first roll stand of the rolling mill train;
   predicting predicted temperatures respectively for the strip sections when the strip sections are rolled in the first roll stand, the predicted temperatures being predicted using a strip model, the predicted temperatures being based on the actual temperatures, the predicted temperatures being predicted using a first prediction horizon corresponding to a plurality of strip sections to be rolled in the first roll stand;
   predicting, using the predicted temperatures, a respective current operator-side and a respective current drive-side material modulus for the strip sections when the strip sections are rolled in the first roll stand, the material moduli describing how the strip sections respond to rolling;
   setting a manipulated variable characteristic, the manipulated variable characteristic being a sequence of values set respectively for the strip sections corresponding to the first prediction horizon, the manipulated variable characteristic being a characteristic that would, if supplied to an adjusting device, have an influence on a profile of a roll gap formed by work rolls of the first roll stand;
   predicting a respective predicted roll gap profile formed by the work rolls of the first roll stand at the time of rolling of the respective strip section, the predicted roll gap profile being predicted using a roll stand model, the predicted temperatures of the strip sections, the material moduli and the manipulated variable characteristic set for the strip sections corresponding to the first prediction horizon;
   optimizing the manipulated variable characteristic based on the predicted roll gap profile for the strip sections and a respective setpoint roll gap profile, the manipulated variable characteristic being optimized to produce an optimized manipulated variable characteristic;
   using a current value of the optimized manipulated variable characteristic as a control parameter; and
   controlling the adjusting device acting on the first roll stand during rolling of the respective strip section, the adjusting device being controlled using the control parameter, the adjusting device influencing the roll gap of the first roll stand on the operator and the drive side, wherein
   predicting predicted temperatures comprises predicting temperatures that are spatially resolved in a strip width direction, and
   the optimized manipulated variable characteristic for a specific strip section is produced by optimizing the whole sequence of values set respectively for the strip sections corresponding to the first prediction horizon.

2. The control method as claimed in claim 1, wherein the strip model comprises a material model,
   a predicted material property other than temperature is predicted using the material model, for the strip sections when the respective strip section is rolled in the first roll stand, and
   the predicted material property is taken into account to determine the control parameter.

3. The control method as claimed in claim 1, wherein determining actual temperatures comprises determining actual temperatures that are spatially resolved in the strip width direction, and the predicted temperatures and the actual temperatures are spatially resolved in the strip width direction so as to relate to at least the operator side and the drive side.

4. The control method as claimed in claim 1, wherein
the predicted temperatures are supplied to a rolling force model,
the rolling force model is used to predict a predicted rolling force required for rolling the respective strip section in the first roll stand, the predicted roll force being predicted using the predicted temperatures for the strip sections corresponding to the first prediction horizon, and
the predicted roll gap profile is predicted using the roll stand model and the predicted rolling force.

5. The control method as claimed in claim 1, wherein the adjusting device comprises a roll cooling device controlled in a spatially resolved manner in a strip width direction.

6. The control method as claimed in claim 1, wherein
a second roll stand downstream of the first roll stand of the rolling mill train has a second adjusting device and a second gap control system,
the second adjusting device is controlled using a second prediction horizon and a second control parameter,
the second gap control system is parameterized using the second prediction horizon,
the strip sections are rolled from a first entry thickness to a first exit thickness in the first roll stand and from a second entry thickness to a second exit thickness in the second roll stand, and
the control method used for the first prediction horizon and the first roll stand is also used for the second prediction horizon and the second roll stand, to control the second adjusting device.

7. The control method as claimed in claim 6, wherein the first exit thickness or the second entry thickness are determined on a strip section specific basis.

8. The control method as claimed in claim 6, wherein the second prediction horizon is dimensioned such that during the second prediction horizon a plurality of strip sections are rolled both in the first roll stand and the second roll stand.

9. The control method as claimed in claim 1, wherein
the control computer uses the strip model and an additional model to determine the control parameter,
the strip model or the additional model is used as a parameterizable model,
the parameterizable model is parameterized by a model parameter additionally to values determined by the strip model or the additional model when determining the material moduli, determining in real-time functional dependencies of said values of the model parameter,
an expected measured value and a functional dependence of the expected measured value on the model parameter are determined for the strip sections in real time using the predicted temperatures, the material moduli, the predicted roll gap, and the manipulated variable characteristic,
a corresponding actual measured value is acquired for the strip sections in each case in real time using a measuring device disposed upstream, on or downstream of the first roll stand,
a corrected model parameter is determined based on the actual measured value, the expected measured value and the functional dependence of the expected measured value on the model parameter,
the parameterizable model is re-parameterized based on the corrected model parameter, and
the predicted temperatures, the material moduli, the predicted roll gap, and the manipulated variable characteristic are adjusted in real time as part of producing the control parameter using the parameterizable model.

10. A non-transitory computer readable storage medium storing a computer program which when executed by a control computer for a rolling mill train, causes the control computer to carry out a control method, the control method comprising:
determining actual temperatures respectively for strip sections of a strip upstream of a first roll stand of the rolling mill train;
predicting predicted temperatures respectively for the strip sections when the strip sections are rolled in the first roll stand, the predicted temperatures being predicted using a strip model, the predicted temperatures being based on the actual temperatures, the predicted temperatures being predicted using a first prediction horizon corresponding to a plurality of strip sections to be rolled in the first roll stand;
predicting, using the predicted temperatures, a respective current operator-side and a respective current drive-side material modulus for the strip sections when the strip sections are rolled in the first roll stand, the material moduli describing how the strip sections respond to rolling;
setting a manipulated variable characteristic, the manipulated variable characteristic being a sequence of values set respectively for the strip sections corresponding to the first prediction horizon, the manipulated variable characteristic being a characteristic that would, if supplied to an adjusting device, have an influence on a profile of a roll gap formed by work rolls of the first roll stand;
predicting a respective predicted roll gap profile formed by the work rolls of the first roll stand at the time of rolling of the respective strip section, the predicted roll gap profile being predicted using a roll stand model, the predicted temperatures of the strip sections, the material moduli and the manipulated variable characteristic set for the strip sections corresponding to the first prediction horizon;
optimizing the manipulated variable characteristic based on the predicted roll gap profile for the strip sections and a respective setpoint roll gap profile, the manipulated variable characteristic being optimized to produce an optimized manipulated variable characteristic;
using a current value of the optimized manipulated variable characteristic as a control parameter; and
controlling the adjusting device acting on the first roll stand during rolling of the respective strip section, the adjusting device being controlled using the control parameter, the adjusting device influencing the roll gap of the first roll stand on the operator and the drive side, wherein
predicting predicted temperatures comprises predicting temperatures that are spatially resolved in a strip width direction, and
the optimized manipulated variable characteristic for a specific strip section is produced by optimizing the whole sequence of values set respectively for the strip sections corresponding to the first prediction horizon.

11. A control computer to control a rolling mill train using actual temperatures respectively for strip sections of a strip upstream of a first roll stand of the rolling mill train, the control computer comprising:

a processor to:

predict predicted temperatures respectively for the strip sections when the strip sections are rolled in the first roll stand, the predicted temperatures being predicted using a strip model, the predicted temperatures being based on the actual temperatures, the predicted temperatures being predicted using a first prediction horizon corresponding to a plurality of strip sections to be rolled in the first roll stand;

predict, using the predicted temperatures, a respective current operator-side and a respective current drive-side material modulus for the strip sections when the strip sections are rolled in the first roll stand, the material moduli describing how the strip sections respond to rolling;

set a manipulated variable characteristic, the manipulated variable characteristic being a sequence of values set respectively for the strip sections corresponding to the first prediction horizon, the manipulated variable characteristic being a characteristic that would, if supplied to an adjusting device, have an influence on a profile of a roll gap formed by work rolls of the first roll stand;

predict a respective predicted roll gap profile formed by the work rolls of the first roll stand at the time of rolling of the respective strip section, the predicted roll gap profile being predicted using a roll stand model, the predicted temperatures of the strip sections, the material moduli and the manipulated variable characteristic set for the strip sections corresponding to the first prediction horizon;

optimize the manipulated variable characteristic based on the predicted roll gap profile for the strip sections and a respective setpoint roll gap profile, the manipulated variable characteristic being optimized to produce an optimized manipulated variable characteristic;

using a current value of the optimized manipulated variable characteristic as a control parameter; and control the adjusting device acting on the first roll stand during rolling of the respective strip section, the adjusting device being controlled using the control parameter, the adjusting device influencing the roll gap of the first roll stand on the operator and the drive side, wherein the predicted temperatures are predicted spatially resolved in a strip width direction, and the optimized manipulated variable characteristic for a specific strip section is produced by optimizing the whole sequence of values set respectively for the strip sections corresponding to the first prediction horizon.

12. A rolling mill train for rolling a strip, comprising:
a first roll stand;
an adjusting device acting on the first roll stand during rolling of the strip, the adjusting device influencing a roll gap of the first roll stand on an operator and a drive side;
an operator- and drive-side roll gap control system;
at least one temperature sensor to determine actual temperatures respectively for strip sections of a strip upstream of the first roll stand of the rolling mill train;
a control computer having a processor to:
predict predicted temperatures respectively for the strip sections when the strip sections are rolled in the first roll stand, the predicted temperatures being predicted using a strip model, the predicted temperatures being based on the actual temperatures, the predicted temperatures being predicted using a first prediction horizon corresponding to a plurality of strip sections to be rolled in the first roll stand;
predict, using the predicted temperatures, a respective current operator-side and a respective current drive-side material modulus for the strip sections when the strip sections are rolled in the first roll stand, the material moduli describing how the strip sections respond to rolling;
set a manipulated variable characteristic, the manipulated variable characteristic being a sequence of values set respectively for the strip sections corresponding to the first prediction horizon, the manipulated variable characteristic being a characteristic that would, if supplied to an adjusting device, have an influence on a profile of a roll gap formed by work rolls of the first roll stand;
predict a respective predicted roll gap profile formed by the work rolls of the first roll stand at the time of rolling of the respective strip section, the predicted roll gap profile being predicted using a roll stand model, the predicted temperatures of the strip sections, the material moduli and the manipulated variable characteristic set for the strip sections corresponding to the first prediction horizon;
optimize the manipulated variable characteristic based on the predicted roll gap profile for the strip sections and a respective setpoint roll gap profile, the manipulated variable characteristic being optimized to produce an optimized manipulated variable characteristic;
use a current value of the optimized manipulated variable characteristic as a control parameter; and
control the adjusting device using the control parameter, wherein
the predicted temperatures are predicted spatially resolved in a strip width direction, and
the optimized manipulated variable characteristic for a specific strip section is produced by optimizing the whole sequence of values set respectively for the strip sections corresponding to the first prediction horizon.

* * * * *

UNITED STATES PATENT AND TRADEMARK OFFICE
CERTIFICATE OF CORRECTION

| | | |
|---|---|---|
| PATENT NO. | : 9,547,290 B2 | Page 1 of 1 |
| APPLICATION NO. | : 14/119972 | |
| DATED | : January 17, 2017 | |
| INVENTOR(S) | : Johannes Dagner et al. | |

It is certified that error appears in the above-identified patent and that said Letters Patent is hereby corrected as shown below:

On the Title Page

Item (75), Column 1, Inventors
Delete "Johanned" and insert -- Johannes --, therefor.

Signed and Sealed this
Seventh Day of March, 2017

Michelle K. Lee
*Director of the United States Patent and Trademark Office*